United States Patent
Sigmund

(10) Patent No.: US 8,052,578 B2
(45) Date of Patent: Nov. 8, 2011

(54) HYDRAULIC VEHICLE CLUTCH SYSTEM AND PREEMPTIVE CONTROL METHOD

(75) Inventor: Joshua David Sigmund, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 821 days.

(21) Appl. No.: 12/130,618

(22) Filed: May 30, 2008

(65) Prior Publication Data

US 2009/0298648 A1 Dec. 3, 2009

(51) Int. Cl.
*B60W 10/02* (2006.01)

(52) U.S. Cl. ........................................ 477/175; 477/169

(58) Field of Classification Search .................. 477/169, 477/174, 175
See application file for complete search history.

(56) References Cited

U.S. PATENT DOCUMENTS

| | | | |
|---|---|---|---|
| 3,688,608 A * | 9/1972 | Leach | 477/145 |
| 4,334,442 A * | 6/1982 | Iwanaga et al. | 477/128 |
| 5,135,071 A | 8/1992 | Shibahata et al. | |
| 5,979,584 A | 11/1999 | Glab et al. | |
| 6,478,707 B1 * | 11/2002 | Jang | 475/119 |
| 6,631,779 B2 | 10/2003 | Watson et al. | |
| 6,697,725 B1 | 2/2004 | Williams | |
| 6,736,746 B2 * | 5/2004 | Hosotani et al. | 475/116 |
| 6,848,555 B2 | 2/2005 | Sakata et al. | |
| 6,898,505 B2 | 5/2005 | Kadota et al. | |
| 7,021,445 B2 | 4/2006 | Brissenden et al. | |
| 7,124,850 B2 | 10/2006 | Lee et al. | |
| 7,290,636 B2 | 11/2007 | Murakami et al. | |
| 7,309,289 B2 | 12/2007 | Kunii et al. | |
| 2003/0109978 A1 | 6/2003 | Murakami et al. | |
| 2006/0122756 A1 | 6/2006 | Billig | |

* cited by examiner

*Primary Examiner* — Ha D. Ho
(74) *Attorney, Agent, or Firm* — Rankin Hill & Clark LLP

(57) ABSTRACT

A hydraulic vehicle clutch system and preemptive control method includes a hydraulic vehicle clutch, a vehicle speed sensing device, a shift position sensing device, and a hydraulic pressure generating system. The pressure generating system sends hydraulic fluid to the clutch at a first pressure when (1) the vehicle speed sensing device indicates that the vehicle speed is at or below a threshold vehicle speed and (2) the shift position sensing device indicates that the shift position is in a nondrive position and at a second, higher pressure when (1) the vehicle speed sensing device indicates that the vehicle speed is at or below the threshold vehicle speed and (2) the shift position sensing device indicates that the shift position is in a drive position.

21 Claims, 6 Drawing Sheets

HYDRAULIC VEHICLE CLUTCH SYSTEM AND PREEMPTIVE CONTROL METHOD

BACKGROUND

The present disclosure relates to a hydraulic vehicle clutch system and a preemptive control method.

Existing vehicle drive force transfer systems deliver a torque from the engine to the wheels of the vehicle through the vehicle drive train/transmission. In a torque transfer system for on-demand or user actuated four wheel drive modes for a vehicle, power from the engine transmission may be selectively split between the front and rear wheels by incorporating a clutch mechanism in a rear wheel differential.

One example of a user controlled power transmitting device is described in U.S. Pat. No. 5,135,071 to Shibahata et al. Torque from a propeller shaft is transferred to a pair of rear wheel axles through a speed control device and a pair of left and right variable torque transmitting clutches. Each variable torque transmitting clutch is enclosed in a clutch case and contains multiple pairs of inner and outer friction plates or discs which are pressed together by a clutch actuating mechanism. When these pairs of discs are brought together, torque supplied by a common shaft is transferred to the drive axle of a wheel. The clutch actuating mechanisms for these plates have sometimes included an electromagnetic actuator that controls a piston with presser members which are used to press the clutch mechanisms inner and outer plate pairs together. However, typically, a hydraulically controlled piston type actuating mechanism has been utilized, such as that described in U.S. Pat. No. 6,848,555 to Takatoshi Sakata et al.

The concept of providing and managing an on-demand type of torque transfer mechanism in which variable torque is provided in a four wheel drive system has also recently been implemented. Such a mechanism is known to provide excellent vehicle stability and control in all types of weather and road conditions. In addition, variable torque four wheel drive systems often minimize the drawbacks of conventional four-wheel drive systems in terms of weight, noise, performance and design capacity limits. U.S. Pat. No. 7,021,445 to Brissenden discloses an on-demand type of variable torque transfer mechanism for incorporation into a vehicle drive train. Unlike conventional on-demand four-wheel drive systems, which often react only to wheel slippage, the conventional variable torque management systems do not wait for wheel slip before beginning activation of semi or total four wheel drive mode. Instead, torque is proactively delivered to the rear wheels whenever the vehicle is accelerating for improved traction and control in both dry and slippery road conditions. When wheel slippage is detected, a variable torque management system can be configured to apportion additional torque to the rear in proportion to the amount of wheel slip. The system can continuously monitor the vehicle's dynamic condition via sensors in the engine, brake and throttle systems, and can adjust front-to-rear torque split for maximum control.

A central, computer-controlled, Power Control Unit (PCU) has been used to determine the right level of torque split (using sophisticated algorithms) for any given moment to provide optimal traction and stability. Torque can be delivered to the rear wheels via an electronic rear differential mechanism that employs a set of electrically controlled wet clutch packs to take up torque from the propeller shafts as the system demands.

Electric clutch actuation for on-demand type clutch mechanisms is currently a very common mode of actuation for the on-demand clutch mechanism. Recently, hydraulic actuation of the clutch has also been attempted. However, there remains a need to advance hydraulic clutch actuation techniques, and to address recognized system limitations. For example, the size, weight, and electrical power consumption requirements along with cooling capacity of current hydraulic clutch mechanisms currently can result in bulky and expensive systems that are sometimes hampered by limited power characteristics, limited reaction time characteristics, limited cooling capacity, limited control, weight considerations, etc. In addition, any improvements in hydraulic clutch system performance (e.g., response time) are desirable, particularly those that do not sacrifice marketability of the clutch system.

SUMMARY

According to one aspect, a preemptive control method for a hydraulic vehicle clutch is provided. More particularly, in accordance with this aspect, a vehicle speed signal representative of a vehicle speed is received. A shift position signal representative of a shift position is received. A pressure of the hydraulic clutch is set to a first pressure when (1) the vehicle speed signal indicates that the vehicle speed is at or below a threshold vehicle speed and (2) the shift position signal indicates that the shift position is a nondrive position. The pressure of the hydraulic clutch is set to a second pressure when (1) the vehicle speed signal indicates that the vehicle speed is at or below the threshold vehicle speed and (2) the shift position signal indicates that the shift position is a drive position. In this aspect, the second pressure is greater than the first pressure.

According to another aspect, a hydraulic vehicle clutch system is provided for a vehicle. More particularly, in accordance with this aspect, the hydraulic vehicle clutch system includes a hydraulic vehicle clutch for transferring torque from a propeller shaft to at least one rear wheel drive axle, a vehicle speed sensing device for monitoring a vehicle speed, and a shift position sensing device for monitoring a shift position of a transmission shift lever. The hydraulic vehicle clutch system also includes a hydraulic pressure generating system for delivering hydraulic fluid at a desired pressure to the hydraulic vehicle clutch for selectively actuating the hydraulic vehicle clutch to couple the propeller shaft and the at least one rear wheel drive axle and thereby transfer torque from the propeller shaft to the at least one rear wheel drive axle. The hydraulic pressure generating system sends the hydraulic fluid to the hydraulic vehicle clutch with the desired pressure at a first pressure when (1) the vehicle speed sensing device indicates that the vehicle speed is at or below a threshold vehicle speed and (2) the shift position sensing device indicates that the shift position is in a nondrive position. The hydraulic pressure generating system sends the hydraulic fluid to the hydraulic vehicle clutch with the desired pressure at a second pressure when (1) the vehicle speed sensing device indicates that the vehicle speed is at or below the threshold vehicle speed and (2) the shift position sensing device indicates that the shift position is in a drive position. In this aspect, the second pressure is greater than the first pressure.

According to still another aspect, a preemptive control method is provided for hydraulically operating a hydraulic vehicle clutch that selectively couples a vehicle drive train to at least one wheel of a vehicle. More particularly, in accordance with this aspect, a vehicle speed is sensed. Likewise, a shift position of a transmission shift lever is sensed. Hydraulic fluid is sent at a pressure to a hydraulic vehicle clutch for selectively coupling the vehicle drive train to the at least one wheel. The pressure is at a first pressure when (1) the vehicle speed is zero and (2) the shift position is a nondrive position. The pressure is at a second, higher pressure when (1) the vehicle speed signal indicates that the vehicle speed is zero and (2) the shift position signal indicates that the shift position is in a drive position. The second pressure is sufficient to partially actuate the hydraulic clutch without coupling the vehicle drive train to the at least one wheel. The pressure is at third pressure when actuating the hydraulic clutch to couple the vehicle drive train to the at least one wheel.

DETAILED DESCRIPTION

Figure 1:
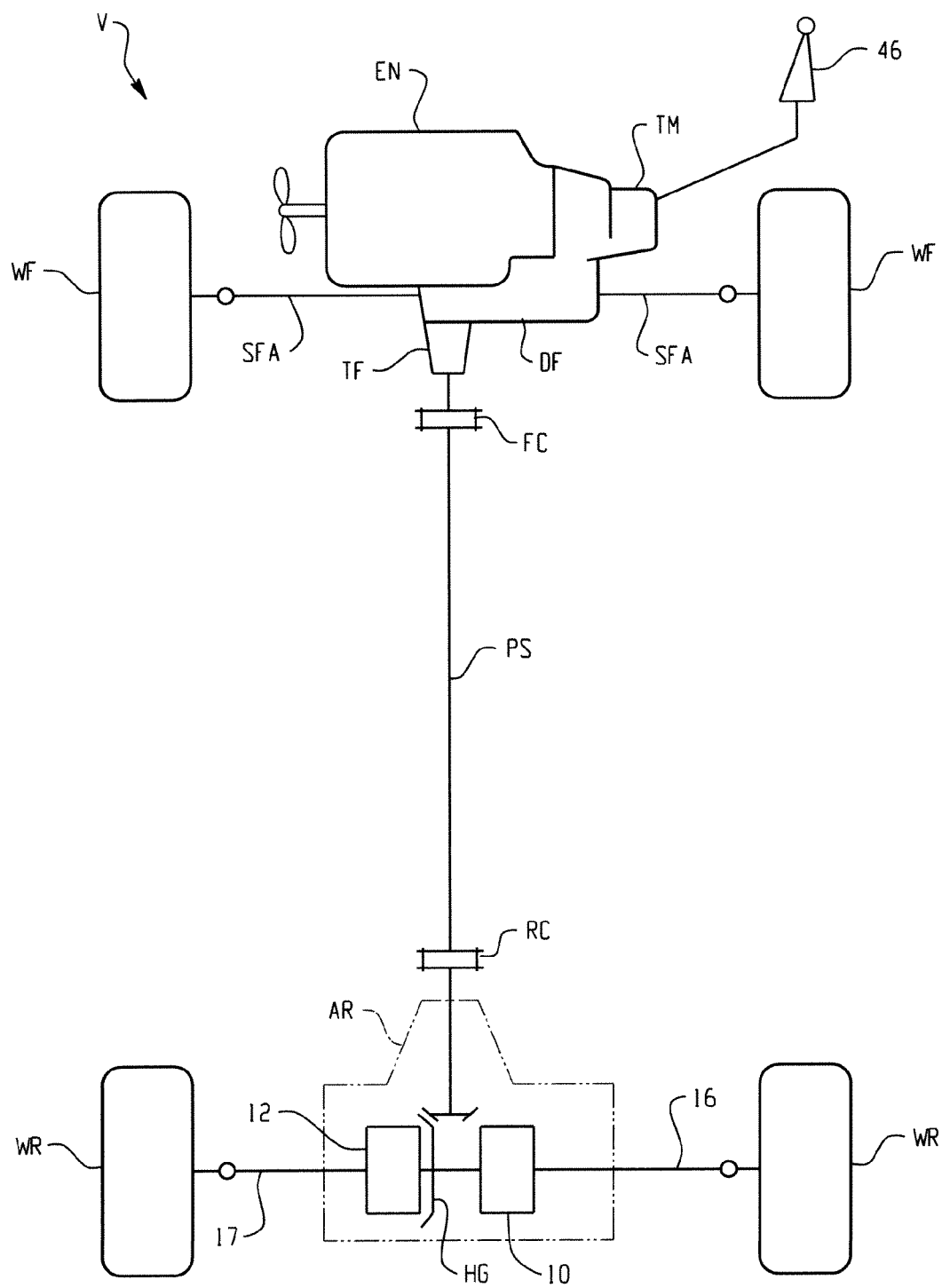
FIG. 1 is a schematic view of a four-wheel drive vehicle including a rear axle device having a pair of hydraulic vehicle clutches.

Referring now to the drawings, wherein the showings are for purposes of illustrating one or more exemplary embodiments, FIG. 1 shows a four-wheel drive vehicle V having an engine EN positioned in a lateral orientation mounted at a front part of the vehicle. The vehicle V also includes a transmission TM having a front differential mechanism DF and a transfer mechanism TF, which is coupled to the output end of the engine EN as a unit. The power of the engine EN is transmitted through the transmission TM with a speed change to the front differential mechanism DF, where power is divided and transmitted to right and left front wheel drive axles SFA for driving the right and left front wheels WF. The power of the engine EN is also divided for the transfer mechanism TF, where the power is transmitted through a front coupling FC to a propeller shaft PS, which is connected through a rear coupling RC to a rear axle device AR.

The rear axle device AR can comprise a hypoid gear mechanism HG (final reduction mechanism) and a right and left couple of rear differential clutches 10 and 12. The hypoid gear mechanism HG operates to change the rotational direction and reduce the rotational speed transmitted from the propeller shaft PS for rotational transmission to rear wheel drive axles 16 and 17, which are disposed orthogonal to the propeller shaft PS. As shown, the rear differential clutch mechanisms 10 and 12 are positioned, respectively, on the right and left sides of the hypoid gear mechanism HG, and they control the transmission of the rotational power from the hypoid gear mechanism HG to the right and left rear axle shafts 16,17. As will be described in more detail below, power from the engine EN is transmitted through the propeller shaft PS, the rotational direction from the propeller shaft PS is changed as well as the rotational speed reduced by the hypoid gear mechanism HG, and the division and transmission of the power to the right and left rear wheel drive axles 16,17 are controlled for driving the right and left rear wheels WR by the right and left rear differential clutch mechanisms 10,12. Alternatively, the hypoid gear mechanism can be replaced with one or more common shafts that are coupled to the propeller shaft PS through some other rotational and force transfer mechanism, for example, a planetary gear system.

Figure 2:
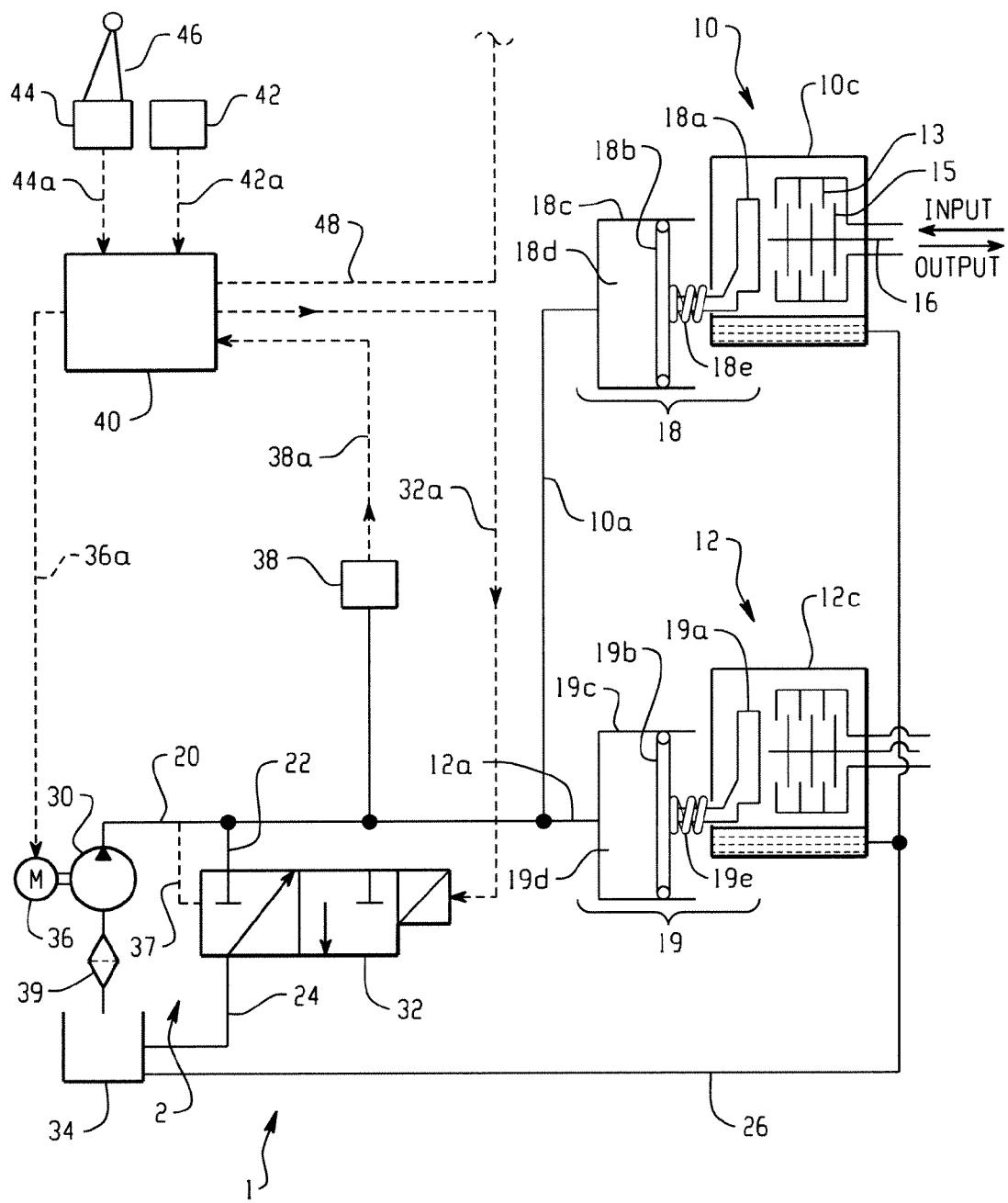
FIG. 2 is a schematic diagram of a hydraulic vehicle clutch system including the hydraulic vehicle clutches of FIG. 1.

FIG. 2 shows a hydraulic vehicle clutch system 1 for operating the clutches 10,12 of vehicle V and transferring torque from the propeller shaft PS to the rear wheel drive axles 16,17. More particularly, the system 1 of the illustrated embodiment includes first hydraulic vehicle clutch 10 for transferring torque from the propeller shaft PS to the rear wheel drive axle 16 and second hydraulic vehicle clutch 12 for transferring torque from the propeller shaft PS to the rear wheel drive axle 17. The hydraulic vehicle clutches 10,12 can be wet-type multi-disc friction clutches of the type described in more detail below, though this is not required. Also, the system 1 need not include two clutches for respectively transferring torque to two rear wheel drive axles. For example, the system could include any number of clutches (e.g., a single clutch or more than two clutches) for transferring torque to any number of drive shafts (e.g., one clutch could transfer torque to two or more rear wheel drive axles or from a front propeller shaft to a rear propeller shaft).

The system 1 can include a pump 30 that is fluidly connected to the clutches 10 and 12, respectively, via hydraulic fluid lines. A purge valve, such as the schematically depicted solenoid operated purge valve 32, can be used to precisely regulate the hydraulic pressure delivered to the clutches 10,12. In one embodiment, the clutches 10,12 can be a pair of variable torque transmitting clutches and, as illustrated, can be integrated into the vehicle's rear axle device AR, which can be referred to generally as the vehicle's rear differential mechanism. When in an engaged state, the clutches 10,12 of the illustrated embodiment transfer torque from the propeller shaft PS to the rear wheels WR of the vehicle V. The amount of torque transferred can be varied by varying the amount of fluid pressure that is delivered to each of the clutches 10,12, as will be described in more detail below. As shown, the clutches 10,12 can be respectively located on opposite sides of the rear axle device AR, and specifically of the hypoid gear mechanism HG. In another embodiment (not illustrated), at least one clutch set can be located in the drive shaft between the engine EN (or some other power plant, when employed) and the rear axle device AR to provide drive to the rear wheels WR.

In the illustrated embodiment, the clutch 10 is the same or similar to the clutch 12 so further details are mostly described with respect to only the clutch 10, but such details apply equally to the clutch 12. More particularly, the clutch 10 can include a first or outer set of friction plates 13 (a driving part) and a second or inner set of friction plates 15 (a driven part). The rear wheel drive axle 16 for the adjacent rear wheel WR is connected to the inner plates 15 for rotation therewith (of course, the rear wheel drive axle 17 is likewise connected to inner plates of clutch 12 for rotation therewith). The friction plates 13,15 can be immersed in a lubricating fluid (e.g., hydraulic oil, etc.) located in a clutch case 10c. As already discussed, the outer friction plates 13 can be configured to be driven by the propeller shaft PS and the hypoid gear mechanism HG in combination. According to this arrangement, the outer friction plates 13 can be driven from an input from the vehicle's engine EN or in an alternate embodiment from any vehicle power unit (e.g., electric motor, etc.). Particularly, the vehicle power unit, such as engine EN, can supply power to the outer friction plates 13 via the vehicle drive train which can include the rear axle device AR that is connected to the propeller shaft PS and the vehicle transmission TF.

An actuation device 18 can be used to actuate the clutch 10. As shown, the actuation device 18 can include a presser member 18a connected to a hydraulic piston 18b. When the hydraulic piston 18b is displaced by hydraulic fluid, the presser member 18a presses the outer plates 13 into engagement with the inner plates 15, thereby coupling the plates 13,15 in torsion. More particularly, piston 18b is movable by pressurized hydraulic fluid generated by a hydraulic pressure generating system 2. Specifically, the piston 18b is movable by the pressurized hydraulic fluid from a first position (e.g., to the left in FIG. 2) to a second position (e.g., to the right in FIG. 2) for selectively moving the clutch plates 13 into coupling engagement with the clutch plates 15.

The actuation device 18 further includes a cylinder 18c forming a chamber 18d. The hydraulic piston 18b is displaced within the chamber 18d between its first and second positions by hydraulic pressure introduced into the chamber 18d by the hydraulic pressure generating system 2. A return spring 18e urges the piston 18b toward its first position and returns the piston 18b to the first position unless sufficient pressure is provided to the chamber 18c. For example, the return spring 18e is disposed within the chamber 18d interposed between the piston 18b and a portion of the clutch case 10c for urging the piston 18b toward its first position. Hydraulic pressure (i.e., pressurized hydraulic fluid) is supplied to the piston chamber 18d from the pressure generating system 2 through first piston line 10a. As already indicated, the right clutch 12 is similarly configured so that it too receives pressurized hydraulic fluid from the hydraulic pressure generating system 2, but through a second piston line 12a.

The hydraulic pressure generating system 2 delivers hydraulic fluid at a desired pressure to the hydraulic vehicle clutches 10,12 for selectively actuating the clutches to couple the propeller shaft PS to respective rear wheel drive axles 16,17 and thereby transfer torque from the propeller torque PS to the rear wheel drive axles 16,17. Specifically, hydraulic pressure can be delivered to the clutches 10,12 via a pump line 20 that is connected to the first and second piston lines 10a, 12a which are respectively connected to the first and second pistons/chambers 18b,18d and 19b,19d of the clutches 10,12. The pressure generating system 2 includes a motor and pump assembly, including the pump 30 and a motor 36 for driving the pump, to pressurize the hydraulic fluid to an amount above the desired pressure and sending the pressurized hydraulic fluid to the clutches 10,12.

The solenoid operated purge valve 32 acts to precisely reduce pressurization of the hydraulic fluid (i.e., micro-adjust) to the desired pressure. More specifically, the purge valve 32 operates to reduce the hydraulic pressure delivered by the pump 30 to the desired pressure by diverting a portion of the fluid delivered from the pump 30. For example, a valve input line 22 can connect the valve 32 to the supply line 20. A valve output line 24 then directs diverted fluid to the reservoir 34 after passing through the valve 32. Thus, the valve 32 can be considered to be connected "in parallel" with the pump 30 and actuation devices 18,19. A pilot line 37 can be provided with the valve 32 to provide a feedback passage to the valve. Moreover, valve 32 can be configured to act as a balance valve which balances the solenoid thrust force with pressure from the feedback line 37. The valve input line 22 and pilot line 37 can be considered passage lines that allow the valve 32 to be connected in parallel with the pump 30 and the actuation devices 18,19. Thus, the pump 30 activates the actuation devices 18,19 by pressurizing and delivering the hydraulic fluid and the valve 32 can be used to precisely control the pressure seen by the actuation devices 18,19.

In operation, the pump 30 draws hydraulic fluid from a reservoir 34 which receives the hydraulic fluid removed from the supply line 20 by the valve 32 and the hydraulic fluid returned from the clutch cases 10c,12c via return line 26. A filter 39 can be placed between an intake of the pump 30 and the reservoir 34 to clean the hydraulic fluid before it is re-routed through the hydraulic lines. In addition, if desired, a separate cooling/lubrication pump can be provided that is configured to separately feed oil or other cooling fluid to one or both of the clutches 10,12. Also, a pressure sensor 38 can be used in the system to detect the pressure received by the pistons 18b,19b, which is the pressure of the hydraulic fluid located downstream of the valve 32.

The hydraulic vehicle clutch system 1 can further include a controller, such as the illustrated electronic control unit (ECU) 40, for controlling the hydraulic pressure generating system 2. The ECU 40 can command the pump and motor assembly 30,36 and the purge valve 32 to supply pressurized hydraulic fluid at the desired pressure to the clutches 10,12. More particularly, the ECU 40 commands the motor and pump assembly 30,36 to supply pressurized hydraulic fluid above the desired pressure and further commands the purge valve 32 to reduce the pressurized hydraulic fluid supplied by the motor and pump assembly 30,36 precisely to the desired pressure. Thus, the ECU 40 sends a motor command signal 36a to the motor 36 of the pump and motor assembly and sends a purge valve command signal 32a to the purge valve 32. The motor 36 then operates the pump 30 in combination with the purge valve 32 to deliver the hydraulic fluid at the desired pressure to the clutches 10,12, and particularly to the pistons 18b,19b of the clutches. The sensor 38 can deliver a signal 38a to the ECU 40 such that the ECU can be apprised of the pressure being realized by the clutches 10,12, and particularly the pistons 18b,19b and piston chambers 18d,19d thereof. The pump 30 can be a fixed displacement electric pump, for example. Also for example, the motor 36 can be a brushless DC motor, and the valve 32 can be a two position, two-way linear solenoid valve that can be operated in a fully opened position, a fully closed position, or at intermediate positions as directed by the ECU 40 via command signal 32a. Still further, for example, the position of the valve 32 can depend on a combination of the hydraulic pressure generated by the pump 30 and the command signal 32a provided by the ECU 40.

The clutch system 1 of FIG. 2 additionally includes a speed sensing device 42 for monitoring a vehicle speed of the vehicle V and a shift position sensing device 44 for monitoring a shift position of a transmission shift lever 46. The vehicle speed sensing device 42 can be any mechanism or sensor that monitors or measures vehicle speed. For example, sensing device 42 can be a sensor that measures wheel speed, crank shaft rotational speed, propeller shaft rotational speed, etc. The shift position sensing device 44 can likewise be any sensor or device that measures the position of the transmission shift lever 46 (e.g., a shift sensor provided in the shifter 46, etc.). The positions of the transmission shift lever 46 can include drive positions and nondrive positions. For example, when the transmission TM is an automatic transmission, the drive positions can include one or more standard drive positions (e.g., D1, D2, D3, etc.) and reverse, and the nondrive positions can include park and neutral.

Each of the sensing devices or sensors 42,44 can send corresponding signals 42a,44a to the ECU 40. More specifically, the vehicle speed sensing device or sensor 42 can send a vehicle speed signal 42a to the ECU 40 representative of the vehicle speed of the vehicle V. Likewise, the shift position sensing device or sensor 44 can send a shift position signal 44a to the ECU to representative of the shift position of the transmission shift lever 46. Accordingly, as illustrated, the ECU 40 receives the vehicle speed signal 42a representative of the vehicle speed from the device or sensor 42 and also receives the shift position signal 44a representative of the shift position of the transmission shift lever 46 from the device or sensor 44. In addition, the ECU 40 can receive a RWD command signal 48 indicating that a torque transfer to the rear wheel drive axles 16,17 is desirable. The command signal can be representative of a determination made elsewhere in the vehicle that RWD is appropriate or needed, or can be one or more signals used by the ECU 40 to determine when RWD would be appropriate or needed (e.g., a signal indicating wheel slippage, etc.).

Figure 3:
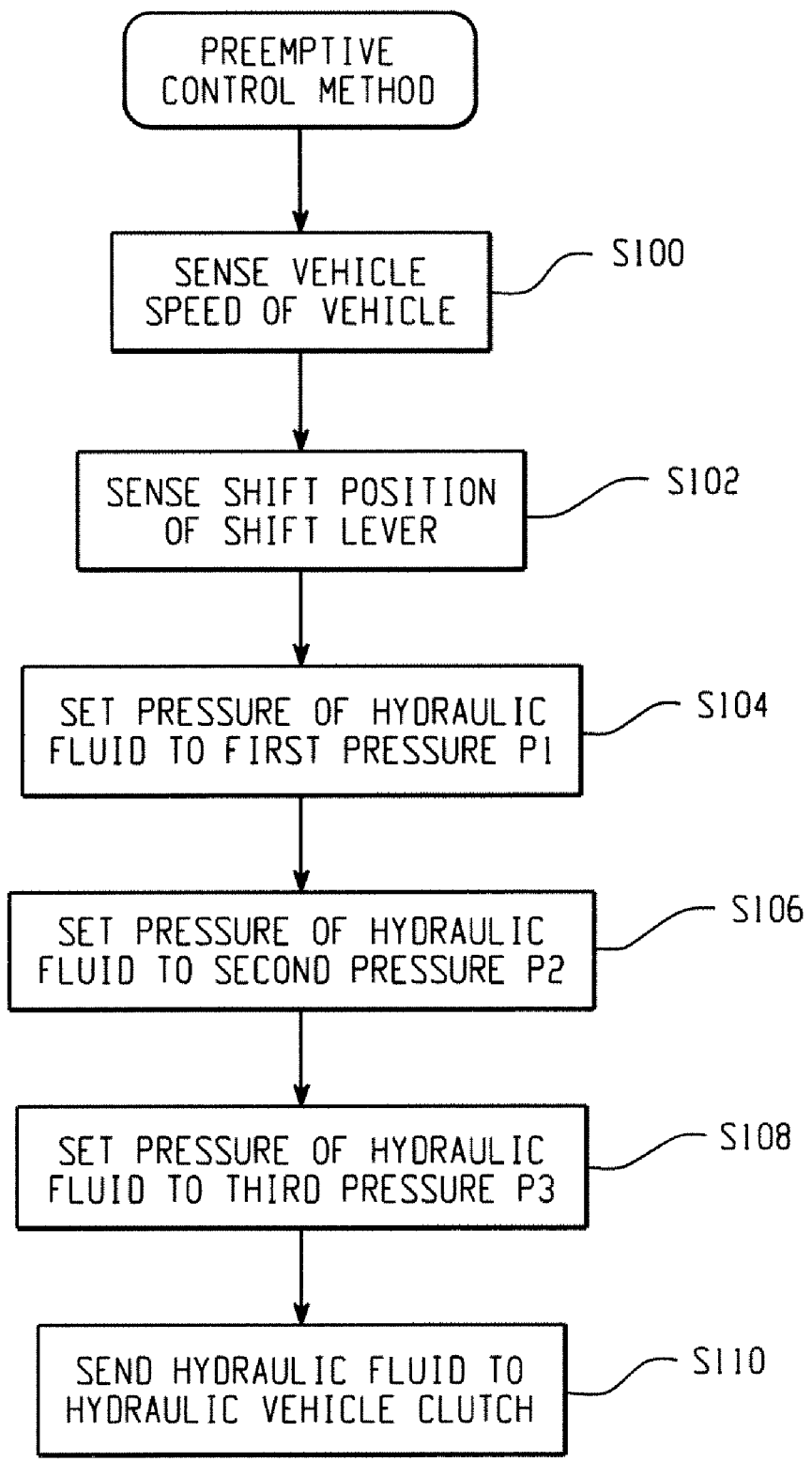
FIG. 3 is a flow diagram illustrating a preemptive control method for the hydraulic vehicle clutch system of FIG. 2.

With further reference to FIG. 3, a preemptive control method for one or more hydraulic vehicle clutches, and more particularly for hydraulically operating one or more hydraulic vehicle clutches that selectively couple a vehicle drive train to at least one wheel of a vehicle will now be described. By way of example only, the method of FIG. 3 will be specifically described in connection with the hydraulic vehicle clutch system 1 of FIG. 2 and its clutches 10,12.

In step S100, the vehicle speed of vehicle V is sensed by the vehicle speed sensing device or sensor 42, which generates the vehicle speed signal 42a representative of the vehicle speed, and delivers the signal 42a to the ECU 40. In step S102, the shift position of the transmission shift lifter 46 is sensed by the shift position sensing device or sensor 44, which generates the shift position signal 44a representative of the shift position and delivers the signal 44a to the ECU. Thus, in steps S100 and S102, the ECU 40 receives the vehicle speed signal 42a representative of the vehicle speed from the device or sensor 42 and receives the shift position signal 44a representative of the shift position from the shift position sensing device or sensor 44.

In steps S104-S108, a pressure of the hydraulic fluid to be received by one or more hydraulic vehicle clutches (e.g., the clutches 10,12) is set to a desired pressure. More specifically, in step S104, the pressure of the hydraulic fluid to be received by the clutches 10,12 is set to a first pressure P1 when (1) the vehicle speed signal 42a indicates that the vehicle speed is at or below a threshold vehicle speed and (2) the shift position signal 44a indicates that the shift position is a nondrive position (e.g., neutral or park). In step S106, the pressure of the hydraulic fluid received by the clutches 10,12 is set to a second pressure P2 when (1) the vehicle speed signal 42a indicates that the vehicle speed is at or below the threshold vehicle speed and (2) the shift position signal 44a indicates that the shift position is a drive position (e.g., D1,D2,D3 or reverse). The second pressure P2 in step S106 is a higher pressure than the first pressure P1 in step S104 for the reasons that will become more apparent from the description below.

In step S108, the pressure of the hydraulic fluid received by the vehicle clutches 10,12 is set to a third pressure P3, wherein the third pressure P3 is greater than the second pressure P2 for reasons that will also become more apparent upon reading the description provided below. In particular, the third pressure P3 can be a pressure sufficient to actuate the hydraulic vehicle clutches 10,12. As already described herein, actuation of the vehicle clutches 10,12, such as when the pressure received by the clutches 10,12 is set to the third pressure P3, couples a driven part of the vehicle clutch and a driving part of the vehicle clutch (e.g., couples the propeller shaft to one of the rear wheel drive axles). In particular, the pressure is set to the third pressure P3 when the vehicle speed sensing device 42 indicates that the vehicle speed is above the threshold vehicle speed (e.g., the vehicle is moving) and a RWD command (via signal 48) is received by the ECU 40 representing a request to couple the propeller shaft PS to one or both of the rear wheel drive axles 16,17 and thereby transfer torque from the propeller shaft PS to the rear wheel drive axles 16,17. Next, in step S110, the hydraulic fluid at the desired pressure (e.g., at the set pressure P1, P2 or P3) is sent to the hydraulic vehicle clutches 10,12 for selectively coupling the vehicle drive train to at least one wheel, or for at least partially actuating the hydraulic vehicle clutches.

In one embodiment, the threshold vehicle speed equals or is set at zero. Thus, the pressure of the hydraulic fluid to be received by the hydraulic vehicle clutches 10,12 is set to the first pressure P1 (step S104) or the second pressure P2 (step S106) only when the vehicle speed signal 42a indicates that the vehicle speed is at zero. In this or another embodiment, the first pressure P1 equals or is set at zero; thus, when the pressure of the hydraulic fluid to be received by the vehicle clutches 10,12 is set to the first pressure P1, it is set to zero (i.e., no pressure or a nominal amount of pressure). Of course, when the first pressure P1 is zero, no actuation of the vehicle clutches 10,12 occurs when hydraulic fluid is delivered to the clutches 10,12 in step S110. In any case (e.g., other embodiments), the first pressure P1 is generally less than an amount needed to compress the clutch return springs (e.g., 18e or 19e) of the hydraulic vehicle clutches 10,12.

in contrast, the second pressure P2 can be an amount sufficient to compress the clutch return springs 18e,19e, but is generally less than an amount needed to actuate the hydraulic vehicle clutches 10,12. Accordingly, when the desired pressure is set to the second pressure P2 in step S106 and the second pressure P2 is delivered to the clutches 10,12 in step S110, the return springs 18e, 19e compress but the clutches do not actuate. The pressure P3 is generally an amount sufficient to actuate the hydraulic clutches 10,12. Thus, when the pressure of the hydraulic fluid received by the vehicle clutches 10,12 is set to the third pressure P3 in step S108 and this third pressure P3 is sent to the hydraulic clutches in step S110, actuation of the clutches 10,12 occurs wherein the propeller shaft PS is connected to the drive axles 16,17 and thus the wheel's WR. It is to be appreciated that the pressure of the hydraulic fluid need not be static. For example, when the pressure of the hydraulic fluid is set to the third pressure P3, this third pressure P3 can be dynamic (e.g., a variable amount of pressure). The variableness of the pressure (e.g., third pressure) can correspond to an amount of torque transfer between the propeller shaft and the rear wheel drive axles 16,17.

By this arrangement, the hydraulic vehicle clutches 10,12 are in respective engaged states when the pressure is set to the third pressure P3 and thus the return springs 18e,19e of the hydraulic clutches 10,12 are compressed and the propeller shaft PS is coupled to the right and left rear wheel drive axles 16,17. The clutches 10,12 are in respective disengaged states when the pressure is set to the first pressure P1 (e.g., zero pressure) wherein the rear wheel drive axles 16,17 are respectively decoupled from the propeller shaft PS. The hydraulic vehicle clutches 10,12 are in respective preemptive states when the pressure is set to the second pressure P2 which causes the return springs 18e,19e to be partially compressed, but does not couple the rear wheel drive axles 16,17 to the propeller shaft PS.

The pistons 18b,19b of the clutches 10,12 are in respective first positions (to the left in FIG. 2) when the clutches 10,12 are in their disengaged states due to the return springs 18e,19e urging the pistons 18b,19b toward their first piston positions and without sufficient pressure in the hydraulic fluid to overcome the urging of the return springs. The pistons 18e,19e are in their respective second positions when the hydraulic clutches 10,12 are in their engaged states wherein pressure of the hydraulic fluid delivered to the clutches 10,12 is sufficient to overcome the urging of the springs 18e,19e and couple the inner and outer clutch plates of the clutches 10,12 (e.g., plates 13 and 15). The pistons 18e,19e are in intermediate positions between the first and second positions when the clutches 10,12 are in their preemptive states wherein the pistons 18b, 19b partially compress the return springs 18e,19e, but do not couple the inner and outer clutch plates (e.g., plates 15 and 16) and thus do not couple the propeller shaft PS with the rear wheel drive axles 16,17.

Figure 4:
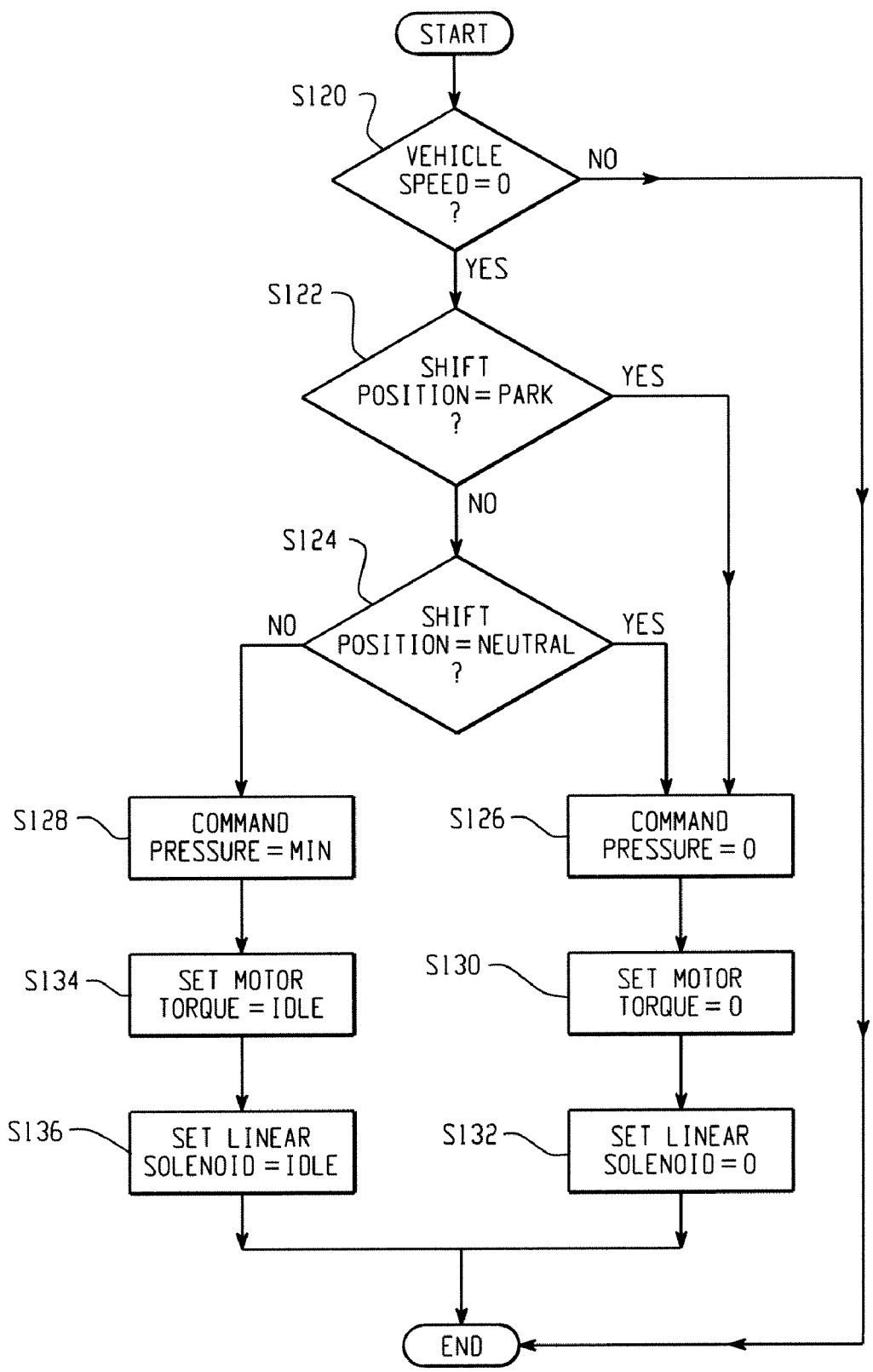
FIG. 4 is a more detailed flow diagram illustrating a preemptive control method for the hydraulic vehicle clutch system of FIG. 2.

With reference to FIG. 4, an exemplary control algorithm is illustrated for the ECU 40 employing the preemptive method of FIG. 3. In step S120, the ECU 40 receives the signal 42a representative of the vehicle speed. If the vehicle speed equals zero, the ECU 40 moves onto step S122. Alternatively, if the vehicle speed is anything but zero, the ECU 40 ends the preemptive control method and operates the clutches 10,12 conventionally. That is, the pressure of the hydraulic fluid received by the vehicle clutches 10,12 is selectively set to the third pressure P3 when so commanded for transferring a variable amount of torque from the propeller shaft PS to the rear wheel drive axles 16,17 as needed (e.g., when the vehicle is moving and the RWD command signal 48 is received). In steps S122 and S124, the ECU 40 receives the shift position signal 44a from the shift position sensor 44 and determines if the shift position is a non-drive position (e.g., park or neutral). If the shift position is determined to be a nondrive position in step S122 or step S124, the pressure of the hydraulic fluid (i.e., the command pressure) is set to zero (step S126); alternatively if the shift position is not in a nondrive position, the pressure of the hydraulic fluid received by the clutches 10,12 (i.e., the command pressure) is set to the second pressure P2 (step S128). More particularly, in step S122 it is determined if the shift position equals park (a nondrive position). If yes, the ECU sends command signals 32a,36a to the purge valve 32 and motor 36 indicating that the pressure to the clutches 10,12 should be zero (an exemplary first pressure P1) in step S126. Likewise, if the shift position equals neutral (another nondrive position) in step S124, the ECU 40 sends command signals 32a,36a instructing the purge valve 32 and motor 36 that the pressure of the hydraulic fluid should be zero (the exemplary first pressure P1 of FIG. 4 in step S126). Alternatively, if the shift position does not equal park in step S122 and does not equal neutral in step S124 (i.e., the shift position is not in a nondrive position), the ECU 40 sends command signals 32a,36a to the purge valve 32 and the motor 36 in step S128 instructing the command pressure to be a minimal amount (i.e., Min, an exemplary second pressure P2). The minimum amount can be an amount greater than zero that compresses the return springs 18e,19e, but is not an amount sufficient to couple the propeller shaft PS to the rear wheel drive axles 16,17.

To command the pressure to be the zero in step S126, the ECU 40 sends signal 36a to the motor 36 indicating that the motor torque should be set to zero (step S130). The ECU 40 also sends signal 32a to the purge valve 32 indicating that the current sent to the purge valve 32 should also be zero (step S132). Thus, in steps S130 and S132, the ECU 40 commands the motor 36 and the purge valve 32 to deliver a command pressure equal to zero by setting a motor torque of the motor 36 and setting a current of the purge valve 32, wherein the motor torque is set to a first torque (e.g., zero torque) and the current is set to a first current (e.g., zero current) when the desired pressure is to be set at the first pressure P1. More particularly, when the first pressure P1 is to be zero, the first torque and first current are also set to be zero.

Figure 5:
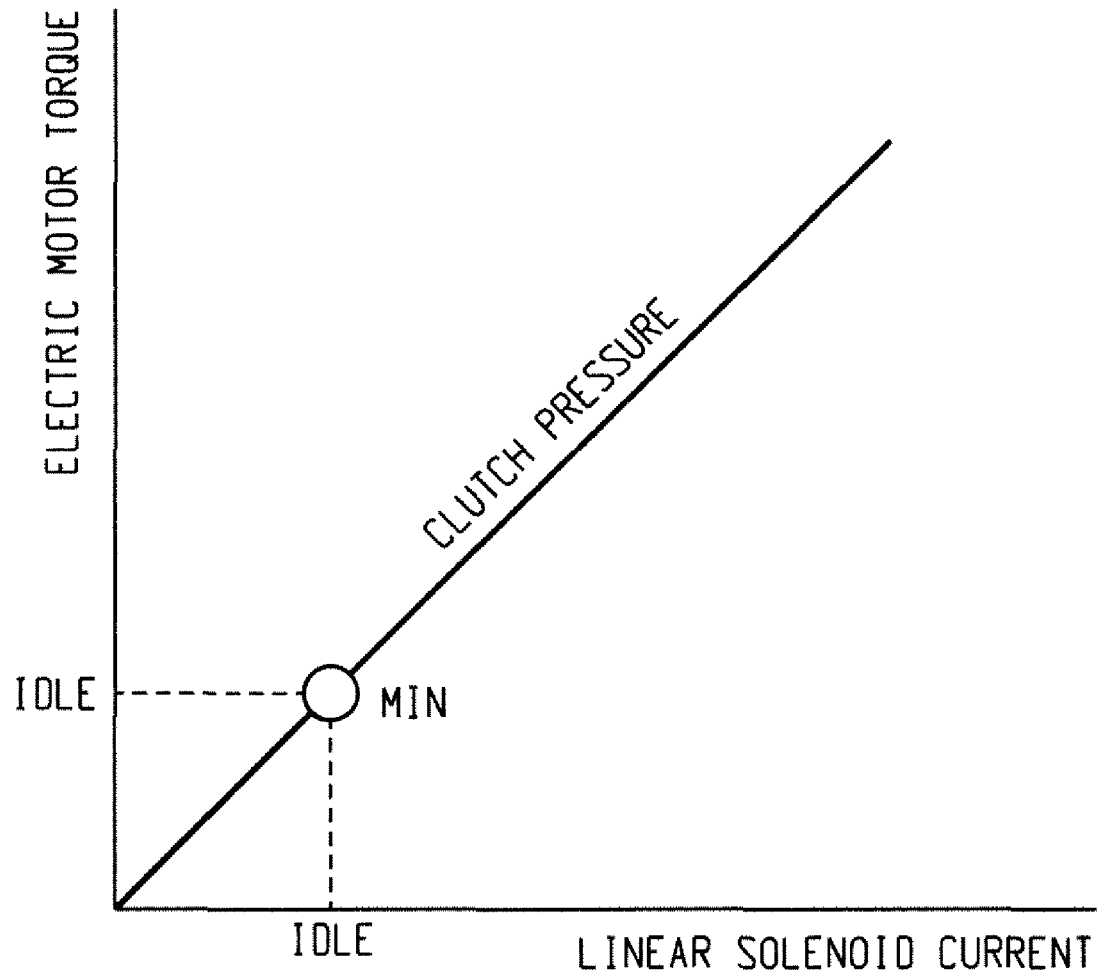
FIG. 5 is a diagram showing linear solenoid current versus electric motor torque and their combined effect on a clutch pressure.

Alternatively, with additional reference to FIG. 5, when the clutch or command pressure is to be a minimum amount (i.e., the second pressure P2) in step S128, the motor torque of the motor 36 is set to idle (step S134) and the current to the purge valve 32 is set to idle (step S136). More particularly, to deliver the hydraulic fluid at the second pressure P2 (a minimum pressure for compressing the return springs 18e,19e, but an amount insufficient to couple the clutches 15,16), the ECU 40 sets the motor torque to a second torque (step S134) and the current to a second current (step S136), which together deliver pressure to the clutches 10,12 at the second pressure P2. In particular, the motor torque can be set such that the motor 36 will operate the pump 30 to deliver pressurized hydraulic fluid to the clutches 10,12 in an amount equal to or greater than the second pressure P2 and the purge valve 32 is operated by the ECU 40 to precisely reduce the pressurized hydraulic fluid to the second pressure P2. As shown in FIG. 5, the ECU 40 commands the motor 36 via command signal 36a (i.e., setting motor torque to an idle setting) and commands the purge valve 32 via command signal 32a (i.e., setting the current to an idle setting) such that in combination the motor and pump assembly 30,36 and the purge valve 32 deliver hydraulic fluid at a desired pressure (e.g., a minimum pressure or the second pressure P2).

Figure 6:
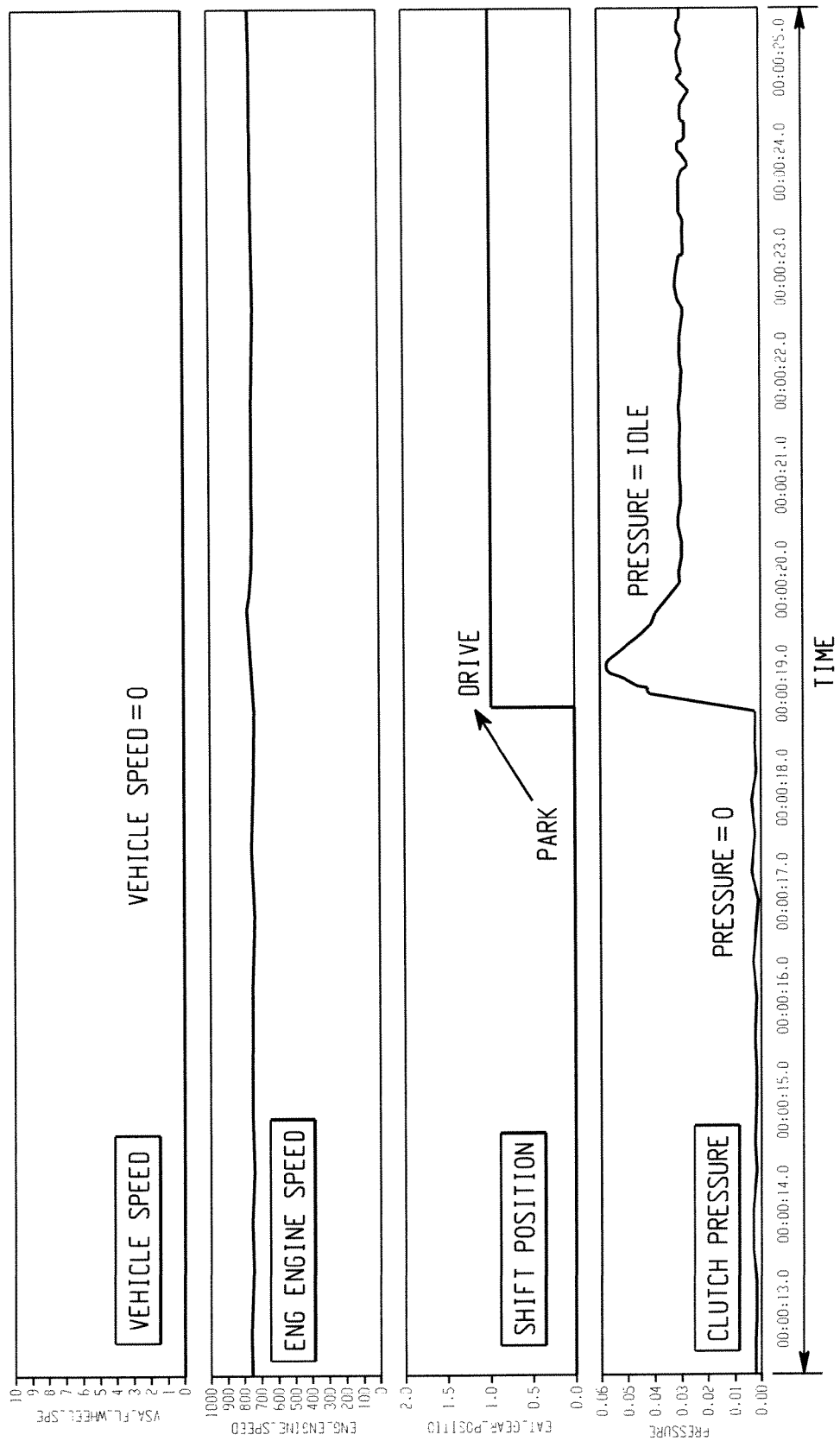
FIG. 6 is a set of comparative charts showing vehicle speed, engine speed, shift position and clutch pressure with respect to time for a hydraulic vehicle clutch system.

FIG. 6 shows a set of comparative charts showing vehicle speed, engine speed, shift position and clutch pressure with respect to time for a hydraulic vehicle clutch system (such as system 1 of FIG. 1). As shown, when vehicle speed equals zero, as can be measured by the engine speed, and the shift position is in a nondrive position, the clutch pressure can be set to the first pressure P1, e.g., equal to zero. When the shift position changes from a nondrive position to a drive position, and vehicle speed continues to equal zero, the clutch pressure can be set to the second pressure P2, e.g., an idle pressure, to put the clutches in respective preemptive states. As can be seen from the clutch pressure chart, the clutch pressure rises almost immediately from the first pressure P1 (e.g., zero) to the second pressure P2 (e.g., idle) when the clutches are moved from their disengaged state to the preemptive state.

Though the illustrated system 1 employs two clutches 10,12 operated within a single hydraulic circuit and controlled by the motor and pump assembly 20,36 and the purge valve 32, it is to be appreciated that alternative arrangements are contemplated and are within the scope of the present disclosure. For example, the two clutches 10,12 could be replaced with a single clutch (e.g., only clutch 10 or some other clutch) connecting a left rear wheel drive axle to a right rear wheel drive axle or connecting a forward portion of a propeller shaft to a rearward portion of a propeller shaft. Still further, the single hydraulic fluid circuit operating the two clutches 10,12 could be replaced with a two hydraulic circuit system wherein a first hydraulic circuit having its own motor and pump assembly and purge valve can operate a first clutch, such as clutch 10, and a second hydraulic circuit having its own motor and pump assembly and purge valve could operate a second clutch, such as clutch 12. Still further, this same two clutch hydraulic circuit system could be modified so that a single motor operates the two pumps.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in common elements and/or components, or separated, where appropriate. For example, the ECU 40 could be distributed throughout the system. It is also to be appreciated that the different aspects of the exemplary embodiments may be selectively employed as appropriate to achieve other alternative embodiments suited for desired applications, the other alternate embodiments thereby realizing the respective advantages of the aspects incorporated therein.

It is also to be appreciated that particular elements or components described herein may have their functionality suitably implemented via hardware, software, firmware, or in combination thereof. For example, the ECU 40 and/or sensors/devices 42 and 44 can be implemented as appropriate hardware circuits or alternately as microprocessors programmed to implement their respective functions. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

It will be appreciated that various of the above-disclosed and other features and functions, or alternative thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A preemptive control method for a hydraulic vehicle clutch, comprising:
   receiving a vehicle speed signal representative of a vehicle speed;
   receiving a shift position signal representative of a shift position;
   setting a pressure of hydraulic fluid received by the hydraulic vehicle clutch to a first pressure when (1) said vehicle speed signal indicates that said vehicle speed is at or below a threshold vehicle speed and (2) said shift position signal indicates that said shift position is a nondrive position; and
   setting said pressure of hydraulic fluid received by the hydraulic vehicle clutch to a second pressure when (1) said vehicle speed signal indicates that said vehicle speed is at or below said threshold vehicle speed and (2) said shift position signal indicates that said shift position is a drive position, said second pressure greater than said first pressure.

2. The preemptive control method of claim 1 wherein said nondrive position includes a transmission shift lever being in a neutral position or a park position.

3. The preemptive control method of claim 1 wherein said threshold vehicle speed equals zero.

4. The preemptive control method of claim 1 wherein said first pressure equals zero.

5. The preemptive control method of claim 1 further including:
   sending the hydraulic fluid at the set pressure to the hydraulic vehicle clutch.

6. The preemptive control method of claim 1 wherein said first pressure is less than an amount needed to compress a clutch return spring of the hydraulic vehicle clutch.

7. The preemptive control method of claim 6 wherein said second pressure is an amount sufficient to compress said clutch return spring, but less than an amount needed to actuate the hydraulic vehicle clutch.

8. The preemptive control method of claim 7 further including:
   setting said pressure of hydraulic fluid received by the hydraulic vehicle clutch to a third pressure, said third pressure greater than said second pressure and sufficient to actuate the hydraulic vehicle clutch; and
   actuating the hydraulic vehicle clutch when said pressure is set to said third pressure coupling a driven part of the hydraulic vehicle clutch and a driving part of the hydraulic vehicle clutch.

9. The preemptive control method of claim 1 wherein setting said pressure to said second pressure includes:
   commanding a motor and pump assembly to supply pressurized hydraulic fluid to the hydraulic vehicle clutch in an amount equal to or greater than said second pressure;
   commanding a purge valve to reduce said pressurized hydraulic fluid to said second pressure when said pressurized hydraulic fluid is at a pressure greater than said second pressure.

10. The preemptive control method of claim 9 wherein said purge valve is a solenoid operated purge valve, and wherein commanding said motor and pump assembly includes setting a torque of a motor of said motor and pump assembly to a first torque, and said commanding said purge valve includes setting a current delivered to said solenoid operated purge valve to a first current, said first torque and said first current causing said pressure of said hydraulic fluid delivered to the hydraulic vehicle clutch to equal said second pressure.

11. The preemptive control method of claim 1 further including:
   setting said pressure of the hydraulic fluid received by the hydraulic clutch to a third pressure to actuate the hydraulic clutch, wherein actuation of the hydraulic clutch includes coupling a propeller shaft powered by a vehicle engine and at least one rear wheel drive axle for transferring torque therebetween, and wherein:
   the hydraulic vehicle clutch is in an engaged state when said pressure is set to said third pressure wherein a return spring of the hydraulic clutch is compressed and said propeller shaft is coupled to said at least one rear wheel drive axle,
   the hydraulic vehicle clutch is in a disengaged state when said pressure is set to said first pressure wherein said at least one rear wheel drive axle is decoupled from said propeller shaft, and
   the hydraulic vehicle clutch is in a preemptive state when said pressure is set to said second pressure wherein said return spring is partially compressed, but said at least one rear wheel drive axle is decoupled from said propeller shaft.

12. The preemptive control method of claim 11 wherein the hydraulic vehicle clutch includes a piston for coupling said at least one rear drive wheel axle and said propeller shaft, said piston in a first piston position when the hydraulic vehicle clutch is in said disengaged state, said return spring urging said piston toward said first piston position, said piston in a second piston position when the hydraulic clutch is in said engaged state, said piston in an intermediate piston position between said first and second piston positions when the hydraulic vehicle clutch is in said preemptive state, said piston partially compressing said return spring when in said intermediate position without coupling said at least one rear wheel drive axle with said propeller shaft.

13. A hydraulic vehicle clutch system for a vehicle, comprising:
- a hydraulic vehicle clutch for transferring torque from a propeller shaft to at least one rear wheel drive axle;
- a vehicle speed sensing device for monitoring a vehicle speed; and
- a shift position sensing device for monitoring a shift position of a transmission shift lever; and
- a hydraulic pressure generating system for delivering hydraulic fluid at a desired pressure to said hydraulic vehicle clutch and selectively actuating said hydraulic vehicle clutch to couple said propeller shaft and said at least one rear wheel drive axle and thereby transfer torque from said propeller shaft to said at least one rear wheel drive axle,
- wherein said hydraulic pressure generating system sends said hydraulic fluid to said hydraulic vehicle clutch with said desired pressure at a first pressure when (1) said vehicle speed sensing device indicates that said vehicle speed is at or below a threshold vehicle speed and (2) said shift position sensing device indicates that said shift position is in a nondrive position, and
- wherein said hydraulic pressure generating system sends said hydraulic fluid to said hydraulic vehicle clutch with said desired pressure at a second pressure when (1) said vehicle speed sensing device indicates that said vehicle speed is at or below said threshold vehicle speed and (2) said shift position sensing device indicates that said shift position is in a drive position, said second pressure greater than said first pressure.

14. The hydraulic vehicle clutch system of claim 13 wherein said hydraulic pressure generating system sends said hydraulic fluid to said hydraulic vehicle clutch with said desired pressure at a third pressure when said vehicle speed sensing device indicates that said vehicle speed is above said threshold vehicle speed and a RWD command is received to couple said propeller shaft and said at least one rear wheel drive axle and thereby transfer torque from said propeller shaft to said at least one rear wheel drive axle.

15. The hydraulic vehicle clutch system of claim 13 wherein said nondrive position includes a transmission shift lever being in a neutral position or a park position, said vehicle speed equals zero, and said first pressure equals zero.

16. The hydraulic vehicle clutch system of claim 13 wherein said hydraulic pressure generating system includes:
- a motor and pump assembly for pressurizing said hydraulic fluid to an amount above said desired pressure and sending said pressurized hydraulic fluid to said vehicle clutch;
- a solenoid operated purge valve for precisely reducing pressurization of said hydraulic fluid to said desired pressure P; and
- a controller for controlling said hydraulic pressure generating system, said controller receiving a vehicle speed signal from said vehicle speed sensing device representative of said vehicle speed and receiving a shift position signal from said shift position sensing device representative of said shift position,
- wherein said controller commands said motor and pump assembly and said solenoid operated purge valve to send said hydraulic fluid with said desired pressure at said first pressure when (1) said vehicle speed signal indicates that said vehicle speed is at or below said threshold vehicle speed and (2) said shift position signal indicates that said shift position is in said nondrive position, and
- wherein said controller commands said motor and pump assembly and said solenoid operated purge valve to send said hydraulic fluid with said desired pressure at said second pressure when (1) said vehicle speed signal indicates that said vehicle speed is at or below said threshold vehicle speed and (2) said shift position signal indicates that said shift position is in said drive position.

17. The hydraulic vehicle clutch system of claim 16 wherein said controller commands said motor and pump assembly and said purge valve by setting a motor torque of the motor and commands said purge valve by setting a current of said solenoid operated purge valve, wherein said motor torque is set to a first torque and said current is set to a first current when said desired pressure is at said first pressure, and wherein said motor torque is set to a second, higher torque and said current is set to a second, higher current when said desired pressure is at said second pressure.

18. The hydraulic vehicle clutch system of claim 17 wherein said first torque is zero and said first current is zero.

19. The hydraulic vehicle clutch system of claim 13 wherein said hydraulic vehicle clutch includes:
- a first set of clutch plates rotatably driven by said propeller shaft;
- a second set of clutch plates connected to said at least one rear wheel axle;
- a piston movable by said hydraulic fluid of said hydraulic pressure generating system from a first position to a second position for selectively moving said first set of clutch plates into coupling engagement with said second set of clutch plates; and
- a return spring urging said piston toward said first piston position.

20. The hydraulic vehicle clutch system of claim 19 wherein:
- said first pressure is less than an amount needed to overcome the urging of said return spring and move said piston from said first piston position toward said second piston position,
- said second pressure is sufficient to overcome the urging of said return spring and move said piston from said first piston position to an intermediate position between said first and second piston positions, but less than an amount sufficient to move said piston to said second piston position wherein said first and second sets of clutch plates are in coupling engagement with one another.

21. A preemptive control method for hydraulically operating a hydraulic vehicle clutch that selectively couples a vehicle drive train to at least one wheel of a vehicle, comprising:
- sensing a vehicle speed;
- sensing a shift position of a transmission shift lever; and
- sending hydraulic fluid at a pressure to a hydraulic vehicle clutch for selectively coupling the vehicle drive train to the at least one wheel;,
- said pressure at a first pressure when (1) said vehicle speed is zero and (2) said shift position is a nondrive position;
- said pressure at a second, higher pressure when (1) said vehicle speed signal indicates that said vehicle speed is zero and (2) said shift position signal indicates that said shift position is in a drive position, said second pressure sufficient to partially actuate said hydraulic clutch without coupling the vehicle drive train to the at least one wheel; and
- said pressure at a third pressure when actuating said hydraulic clutch to couple the vehicle drive train to the at least one wheel.

* * * * *